(12) United States Patent
Riedel et al.

(10) Patent No.: US 7,960,864 B2
(45) Date of Patent: Jun. 14, 2011

(54) ARRANGEMENT AND METHOD FOR PROVIDING POWER TO A CIRCUIT USING SWITCHED CAPACITOR TECHNIQUES

(75) Inventors: Friedbert Riedel, Zug (CH); Giovanni Genna, Zurich (CH)

(73) Assignee: NXP B.V., Eindhoven (NL)

( * ) Notice: Subject to any disclaimer, the term of this patent is extended or adjusted under 35 U.S.C. 154(b) by 258 days.

(21) Appl. No.: 12/513,690

(22) PCT Filed: Nov. 6, 2007

(86) PCT No.: PCT/US2007/083715
§ 371 (c)(1),
(2), (4) Date: May 6, 2009

(87) PCT Pub. No.: WO2008/070381
PCT Pub. Date: Jun. 12, 2008

(65) Prior Publication Data
US 2009/0322153 A1    Dec. 31, 2009

Related U.S. Application Data

(60) Provisional application No. 60/857,718, filed on Nov. 7, 2006.

(51) Int. Cl.
*H02J 1/00* (2006.01)
*H02J 3/00* (2006.01)

(52) U.S. Cl. ........................................................ 307/80
(58) Field of Classification Search ................... 307/66, 307/70, 80, 85, 86
See application file for complete search history.

(56) References Cited

U.S. PATENT DOCUMENTS

| 5,440,263 | A | 8/1995 | Fournel et al. |
| 6,268,711 | B1 | 7/2001 | Bearfield |
| 6,411,069 | B1 | 6/2002 | Hollmer |
| 2001/0026226 | A1 | 10/2001 | Andersson et al. |
| 2004/0217653 | A1* | 11/2004 | Neidorff ........................ 307/80 |

* cited by examiner

*Primary Examiner* — Jared J Fureman
*Assistant Examiner* — Carlos Amaya

(57) ABSTRACT

Switching power supplies are implemented using a variety of methods and devices. According to an example embodiment of the present invention, an arrangement provides power to a circuit by selecting between a first supply and a second supply. The arrangement includes a first circuit that charges a first capacitive element using the first supply and generates a first reference voltage by distributing charge between the first capacitive element and a second capacitive element. The arrangement also includes a first comparator that compares the first reference voltage to a second reference voltage derived from the second supply and a second comparator that compares the first reference voltage to a third reference voltage. The arrangement further includes a power control circuit that selects one of the supplies based on the results of the comparisons.

20 Claims, 5 Drawing Sheets

ARRANGEMENT AND METHOD FOR PROVIDING POWER TO A CIRCUIT USING SWITCHED CAPACITOR TECHNIQUES

FIELD OF THE INVENTION

The present invention relates generally to providing power to a circuit by switching between a first power supply and a second power supply and more particularly to using switched capacitor techniques to select one of the power supplies.

BACKGROUND

An integrated circuit often has a main power supply ($V_{CC}$) and a backup power supply. One purpose of a backup supply is to allow the circuit to continue to function when the main power supply is interrupted or drops below a preset voltage level for some reason. A switchover circuit is used to switch the internal power ($V_{dd}$) of the circuit between the main supply and the backup supply. It is desirable to have a switchover circuit that uses internal power ($V_{dd}$) as its supply voltage and that uses a low amount of power. As circuits continue to decrease in size, it is also desirable for a switchover circuit that occupies a small area.

One example of a backup power supply for an integrated circuit is a battery. In this instance, a switchover circuit that uses a low amount of power would be useful to extend battery life. For example, a switchover circuit of the type discussed above would be useful in electronic devices in which the power from the net is used together with a backup supply (e.g. clock radio, e-metering, etc).

In one example of a switchover circuit, the switchover circuit includes two comparators that compare the main power supply voltage ($V_{CC}$) to the backup battery voltage ($V_{BAT}$) and to a battery threshold value ($V_{BMT}$). The comparators are powered with internal power ($V_{dd}$), and the battery threshold value ($V_{BMT}$) is generated by a reference circuit that is also powered with internal power ($V_{dd}$). The switchover circuit switches to the backup battery when the voltage of the main supply ($V_{CC}$) is less than both the battery voltage ($V_{BAT}$) and the battery threshold value ($V_{BMT}$), and switches back to the main power supply when the main supply voltage is greater than the battery voltage or the battery threshold value. However, this type of switchover circuit has several limitations. For example, the battery threshold value ($V_{BMT}$) has to be specified at a value lower than the minimum voltage of the internal power ($V_{dd}$) because the battery threshold value is generated by a reference circuit that is powered with internal power.

One possible solution to these problems is to power the comparators and the reference circuit that generates the battery threshold value ($V_{BMT}$) with a voltage level higher than the internal power ($V_{dd}$). The higher voltage level can be generated by using a doubler to increase the voltage level of the internal power ($V_{dd}$). However, the addition of a doubler can increase the size and the power consumption of the switchover circuit.

In another example of a switchover circuit, the comparators are supplied by internal power ($V_{dd}$), but they compare partitioned levels of the inputs (e.g., $V_{CC}/2$, $V_{BAT}/2$ and $V_{BMT}/2$). In this case, a partitioned level of the battery threshold value ($V_{BMT}$) is generated; therefore, the battery threshold value can be greater than the minimum voltage of the internal power ($V_{dd}$). Previous approaches have used a bandgap source or a resister divider to generate the partitioned voltage levels for the comparators. However, a bandgap source and a resister divider can result in an increase in the power consumption and in the size of the switchover circuit.

These and other issues have presented challenges to the implementation of switchover circuits.

SUMMARY

Various aspects of the present invention are directed to arrangements for and methods of switching between a first power supply and a second power supply in a manner that addresses and overcomes the above-mentioned issues and other issues as directly and indirectly addressed in the detailed description that follows.

According to an example embodiment of the present invention, an arrangement provides power to a circuit by selecting between a first supply and a second supply. The arrangement includes a first circuit that charges a first capacitive element using the first supply and generates a first reference voltage by distributing charge between the first capacitive element and a second capacitive element. The arrangement also includes a first comparator that compares the first reference voltage to a second reference voltage derived from the second supply and a second comparator that compares the first reference voltage to a third reference voltage. The arrangement further includes a power control circuit that selects one of the first supply and the second supply based on the comparisons performed by the comparators.

According to another example embodiment of the present invention, a method is presented for providing power to a circuit by selecting between a first supply and a second supply. A first capacitive element is charged using the first supply and a first reference voltage is generated by distributing charge between the first capacitive element and a second capacitive element. The first reference voltage is compared to a second reference voltage derived from the second supply and to a third reference voltage. One of the first supply and the second supply is selected based on the results of the comparisons.

The above summary of the present invention is not intended to describe each embodiment or every implementation of the present invention. Advantages and attainments, and other attributes, will become apparent and appreciated by referring to the following detailed description and claims taken in conjunction with the accompanying drawings.

BRIEF DESCRIPTION OF THE DRAWINGS

The invention may be more completely understood in consideration of the following detailed description of various embodiments of the invention in connection with the accompanying drawings, in which.

Figure 1:
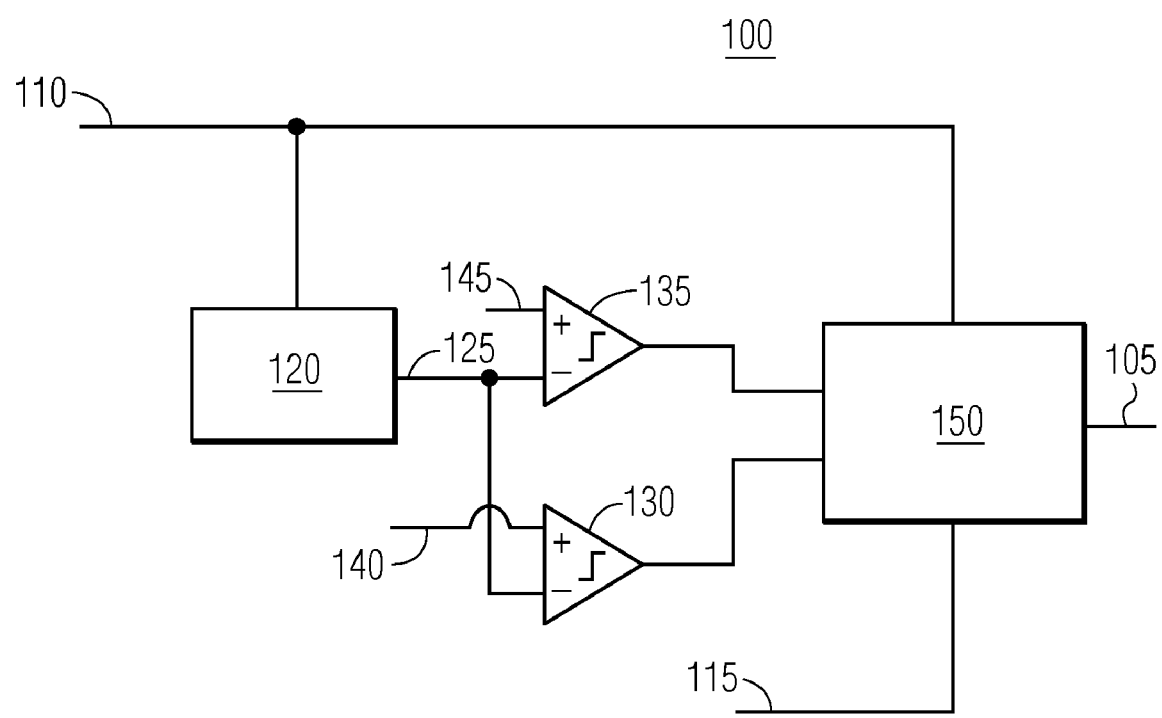
FIG. 1 illustrates an arrangement that provides power to a circuit, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

The present invention is believed to be applicable to a variety of arrangements and approaches for switching between a first and a second power supply and approaches involving switching capacitive elements. While the present invention is not necessarily limited to such applications, an appreciation of various aspects of the invention is best gained through a discussion of examples in such an environment.

According to an example embodiment of the present invention, an arrangement provides power to a circuit by selecting between a first power supply and a second power supply. The arrangement includes a first circuit that generates a first reference voltage by charging the first capacitive element using the first supply and generating the first reference voltage by distributing charge between the capacitive elements. The arrangement also includes a first comparator that compares the first reference voltage to a second reference voltage derived from the second supply, and a second comparator that compares the first reference voltage to a third reference voltage. The arrangement further includes a power control circuit that selects one of the first and second supplies based on the results of the comparisons performed by the comparators.

According to another example embodiment of the present invention, the third reference voltage is derived from a threshold value. The threshold value is a preset voltage level that it is desirable for the supply voltage of the circuit to be above. For example, the threshold value can be the minimum voltage that the circuit requires to function properly. In one implementation, the threshold value is generated by a bandgap reference circuit that can use the internal power ($V_{dd}$) of the arrangement as its supply voltage.

According to a further example embodiment of the present invention, the first and second capacitive elements are capacitors of approximately equal capacitance. There are a variety of different types of capacitors and processes for making capacitors. One of skill in the art would recognize that while a process may be designed to produce capacitors of equal capacitance, there are actually small variations in capacitance between the capacitors. Therefore, capacitors of approximately equal capacitance may be considered capacitors that are made by a process that is designated to produce capacitors of equal capacitance (e.g., 1% tolerance). The first reference voltage is generated in two steps. In step one, the first capacitor is charged using the first power supply and the second capacitor is discharged. In step two, charge is distributed between the first capacitor and the second capacitor thereby generating the first reference voltage which is one-half of the first power supply voltage. The reference voltage is valid only for the time period of step two as is illustrated in FIG. 2F and discussed in detail below. In one implementation, step one can be short (on the order of 10 μs) and step two can be much longer (on the order of 1 ms). The length of the second step is long enough for the realization of the electronic functionality of the circuit. The current consumption of the first circuit during the generation of the first reference voltage is on the order of 50 nAmps.

Turning now to the figures, FIG. 1 illustrates an arrangement 100 that provides power 105 to a circuit by selecting between a first power supply 110 and a second power supply 115, according to an example embodiment of the present invention. The arrangement 100 includes a first circuit 120 that generates a first reference voltage 125 derived from the first power supply 110. The first circuit 120 charges a first capacitive element using the first power supply 110 and generates the first reference voltage 125 by distributing charge between the first capacitive element and a second capacitive element. In one implementation, the first and second capacitive elements are two capacitors of approximately equal capacitance and the generated first reference voltage 125 is one-half of the first power supply 110 voltage. In some instances, it would be desirable to generate a reference voltage that greater than or less than one-half of the supply voltage. One of skill in the art would recognize that different reference voltage levels can be generated by varying the size of the capacitive elements relative to each other.

The arrangement 100 also includes a first comparator 130 and a second comparator 135. The first comparator 130 compares the first reference voltage 125 with a second reference voltage 140 that is derived from the second power supply 115. In one implementation, the second reference voltage 140 is one-half of the second power supply 115 voltage. The second power supply 115 voltage can be greater then the first power supply 110 voltage and the comparators 130, 135 can be powered with internal power ($V_{dd}$). By generating references voltages 125, 140 that are the same level relative to the supply voltages 110, 115, the results of the comparisons will be the same as if the actual supply voltages were compared. The second comparator compares the first reference voltage 125 with a third reference voltage 145. In one implementation, the third reference voltage 145 is one-half of a threshold value. By using one-half of the threshold value, the circuit that generates the threshold value can be powered with internal power ($V_{dd}$) and the threshold value can be greater than the minimum voltage of the internal power as discussed above. The arrangement 100 further includes a power control circuit 150 that selects one of the first power supply 110 and the second power supply 115 to provide the power 105 based on the comparisons performed by the first comparator 130 and the second comparator 135. In one implementation, the first power supply 110 is main power (e.g., $V_{CC}$), the second power supply 115 is a backup battery (e.g., $V_{BAT}$) and the threshold value is a battery mode threshold value (e.g., $V_{BMT}$).

The arrangement of FIG. 1 can be implemented for use in and with a variety of devices and applications. For instance, the arrangement 100 can be implemented on an integrated circuit using CMOS technology and processes or other similar types of approaches. In another example, the arrangement can be used to provide power to a CMOS integrated circuit.

Figure 2A:
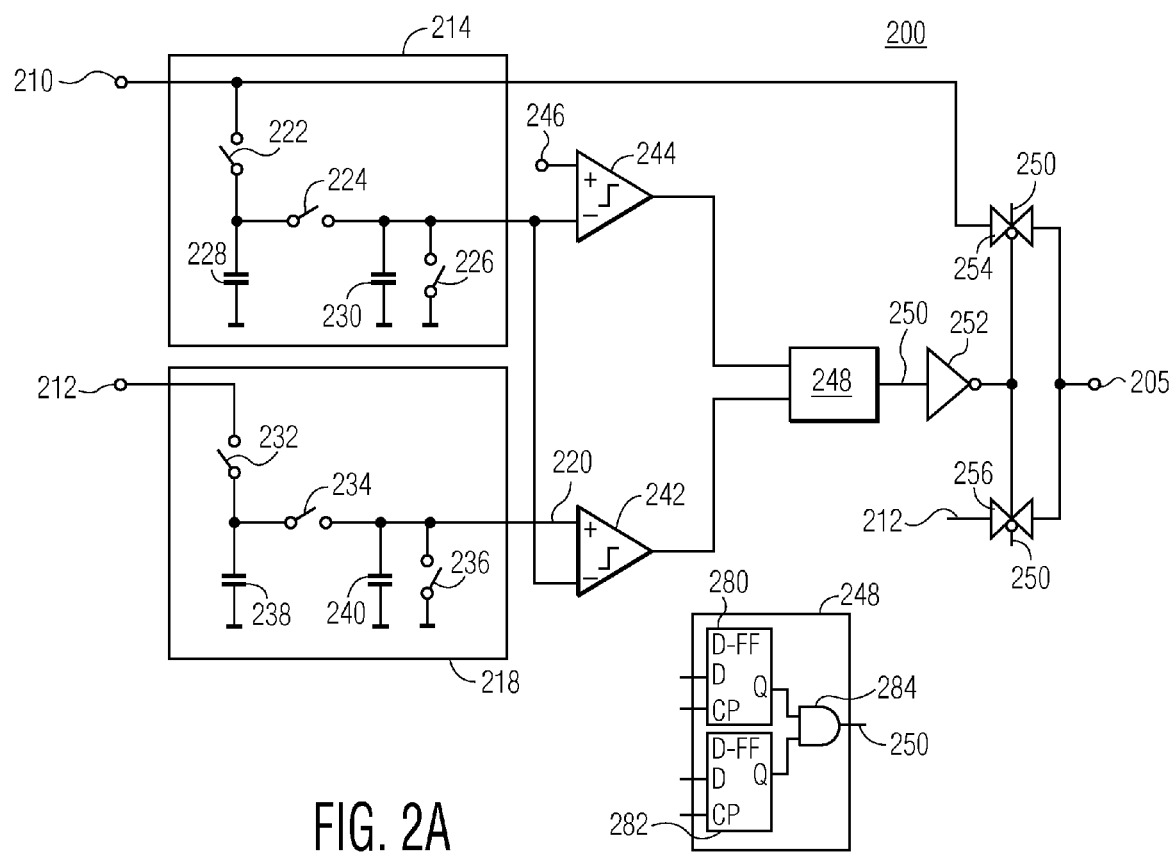
FIG. 2A illustrates an arrangement that provides power to a circuit, according to another example embodiment of the present invention.

FIG. 2A illustrates an arrangement 200 that provides power 205 to a circuit by selecting between a first power supply 210 and a second power supply 212, according to another example embodiment of the present invention. The arrangement 200 includes a first circuit 214 that generates a first reference voltage 216 derived from the first power supply 210 and a second circuit 218 that generates a second reference voltage 220 derived from the second power supply 212. The first circuit 214 includes three switches 222, 224, 226 and two capacitive elements 228, 230. In one implementation, the switches 222, 224, 226 are CMOS switches. The first reference voltage 216 is generated in two steps. In step one, capacitive element 228 is charged using the first power supply 210 by closing switch 222 and opening switch 224; capacitive element 230 is discharged by closing switch 226. In step two, charge is distributed between capacitive element 228 and capacitive element 230 by opening switches 222, 226 and closing switch 224. The second reference voltage 220 is generated from the second power supply 212 by the second circuit 218 in the same manner as the first reference voltage 216 using switches 232, 234, 236 and capacitive elements 238, 240. In one implementation, the capacitive elements 238, 240 are two approximately equal capacitors and the generated second reference voltage 220 is one-half of the second power supply 212 voltage.

The arrangement 200 also includes a first comparator 242 and a second comparator 244. The first comparator 242 compares the first reference voltage 216 to the second reference voltage 220 and the second comparator 244 compares the first reference voltage to a third reference voltage 246. In one implementation, the third reference voltage 246 is generated from a threshold value in a manner similar to that used to generate the first reference voltage 216 from the first power supply 210. The threshold value can be greater than the minimum voltage of the internal power ($V_{dd}$). The outputs of the comparators are provided to control logic 248. Control logic can be implemented using a variety of different circuits. In one implementation, control logic 248 includes a NAND gate. In another implementation, control logic 248 includes two D-flip flops 280, 282 for data sampling and a NAND gate 284; the outputs of the comparators 242, 244 are each inputted to one of the D-flip flops. This can be particularly useful for sampling and comparing the voltages during a time during which the reference voltages are stable.

The output 250 of control logic 248 will be high when the first reference voltage 216 is greater than one or both of the second reference voltage 220 and the third reference voltage 246. In this case, the output of inverter 252 will be low causing switch 254 to be closed and the power 205 to be supplied from the first power supply 210. The output 250 of control logic 248 will be low when the first reference voltage 216 is less than both the second reference voltage 220 and the third reference voltage 246. In this case, the output of inverter 252 will be high causing switch 256 to be closed and the power 205 to be supplied from the second power supply 212.

Figure 2B:
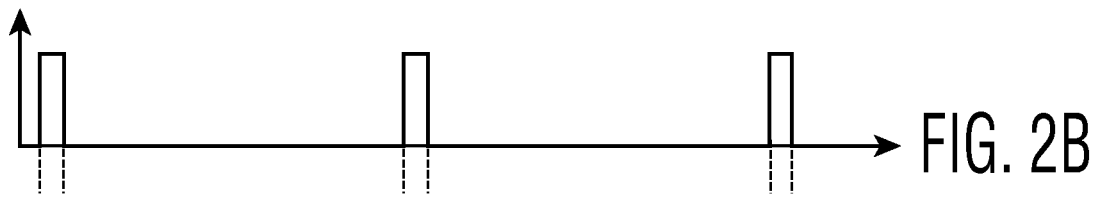
FIGS. 2B-2H illustrate the signal levels at selected points of the arrangement depicted in FIG. 2A and at various times, according to an example embodiment of the present invention.
Figure 2C:
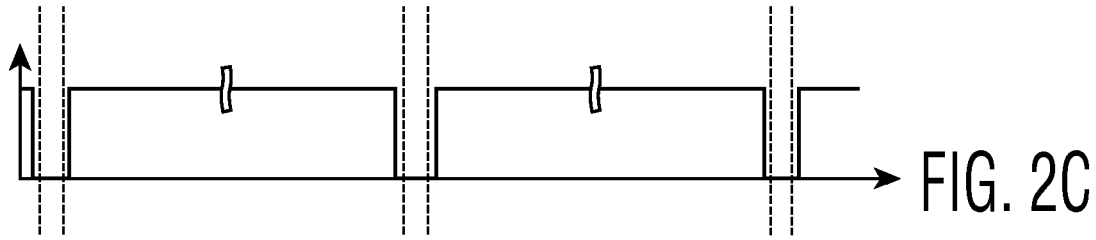
Figure 2D:
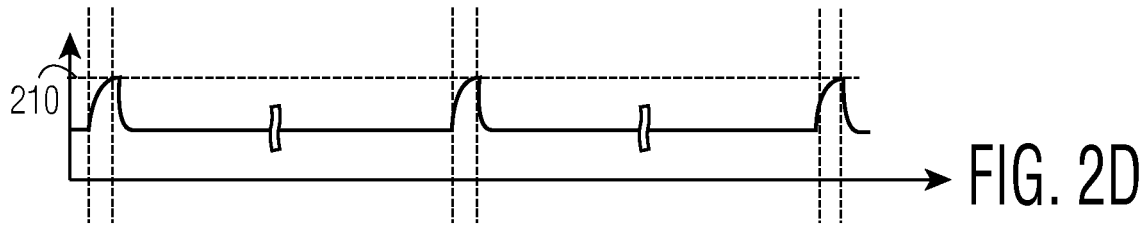
Figure 2E:
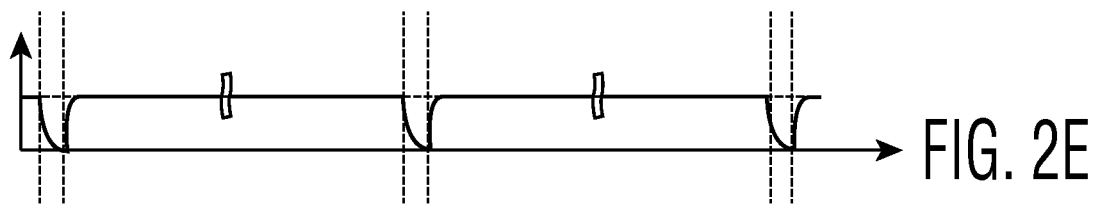
Figure 2F:
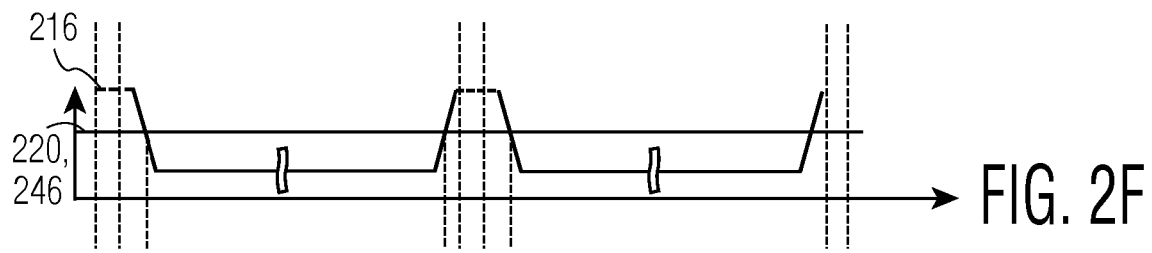

FIGS. 2B-2H illustrate the signal levels at selected points of the arrangement 200 depicted in FIG. 2A and at various times, according to an example embodiment of the present invention. As discussed above, in step one, switches 222, 226 are closed at time $t_1$ as shown in FIG. 2B where the control voltage of the switches is high. Switch 224 is open at time $t_1$ as shown in FIG. 2C where the control voltage of the switch is low (e.g., 0V). Also at time $t_1$, capacitive element 228 is charged using the first power supply 210 as shown in FIG. 2D and capacitive element 230 is discharged to 0V as shown in FIG. 2E. The capacitive element 228 is charged to a voltage approximately equal to the voltage of the first power supply 210.

Figure 2G:
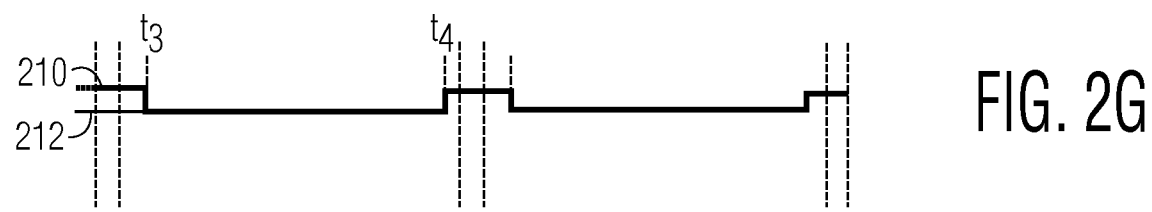
Figure 2H:
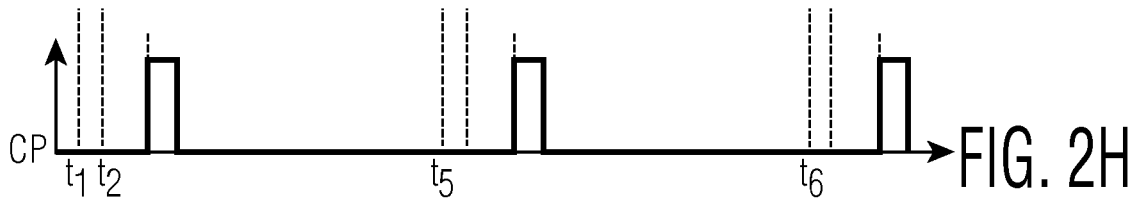

In step two switches 222, 226 are open or low as shown in FIG. 2B at time $t_2$ and switch 224 is closed or high as shown in FIG. 2C. In one implementation, as depicted in FIGS. 2C and 2B, the controlling of the switches 222, 224, 226 is non-overlapping; therefore, the switching of switch 224 occurs slightly after time $t_2$. When switch 224 is closed, the charge on the first capacitive element 228 is distributed to the second capacitive element 230 as shown in FIGS. 2D and 2E. The first reference voltage 216 is generated as shown in FIG. 2F. When the capacitive elements 228, 230 are capacitors of approximately equal capacitance and switch 224 is closed, the charge is distributed equally between the capacitors and the first reference voltage is approximately one-half of the first supply voltage 210 as shown in FIGS. 2D and 2E. For simplicity, the second reference voltage 220 and the third reference voltage 246 are shown in FIG. 2F as being equal; however, the second reference voltage can be greater or less than the third reference voltage. The power 205 is supplied from the first power supply 210 or the second power supply as shown in FIG. 2G. Between time $t_2$ and time $t_3$, when the first reference voltage 216 is greater than one or both of the second reference voltage 220 and the third reference voltage 246, the power 205 is supplied from the first power supply 210. From time $t_3$ to time $t_4$, the power 205 is supplied from the second power supply 212, because the first reference voltage 216 is less than both the second reference voltage 220 and the third reference voltage 246. The clock CP that controls the D-flip flops 280, 282 is shown in FIG. 2H.

This process is repeated at times $t_5$ and $t_6$ as is shown in FIGS. 2B-2H in order to supply the comparators with accurate reference voltages derived from the first and second power supplies. In one implementation, step one can be short (on the order of 10 μs) and step two can be much longer (on the order of 1 ms). One limitation on the step two time period is the leakage currents of the switches and the capacitive elements and the resulting discharge error between the first and second reference voltages 216 and 220. The length of the second step is long enough for the realization of the electronic functionality of the circuit as the generated reference voltages are only valid during step two. The accuracy of the first reference voltages 216 is determined by the residual feed through error of the switches 222, 224, 226 and the mismatch error between the capacitive elements 228, 230. In one implementation, the capacitive elements 228, 230 are 25 pF capacitors, the dimension of the switches 222, 224, 226 are W/L=1 and the controlling of the switches is non-overlapping (as shown in FIGS. 2B-2C); the resolution error for the first reference 216 voltage is approximately 5 mV and the current consumption of the first circuit 214 during the generation of the first reference voltage in step two is on the order of 50 nAmps.

Figure 3A:
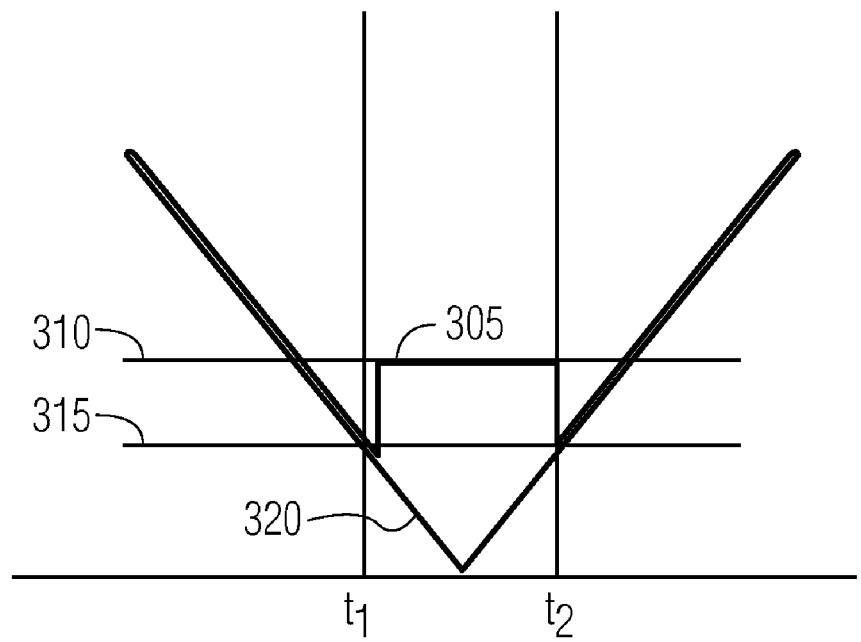
FIGS. 3A and 3B illustrate the power being provided to a circuit at various times, according to an example embodiment of the present invention.
Figure 3B:
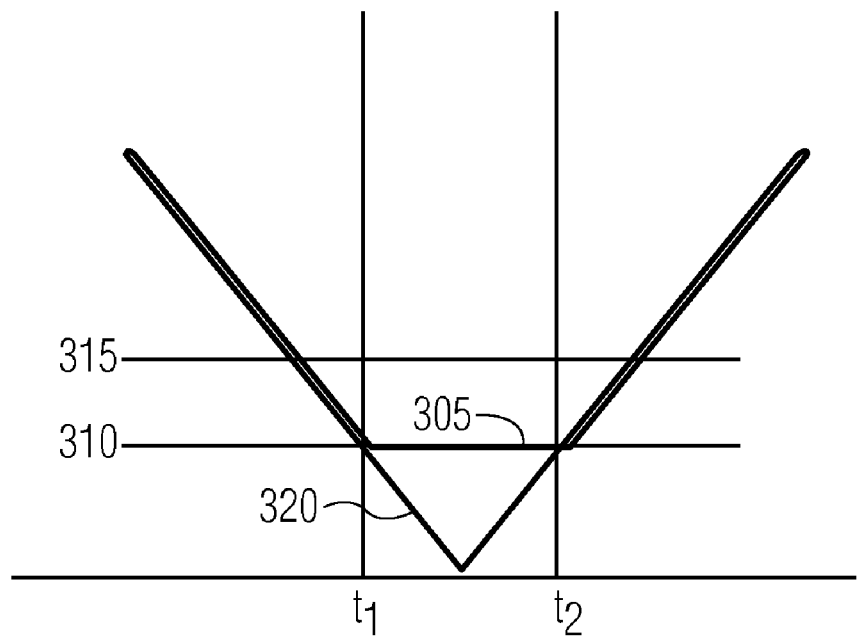

FIGS. 3A and 3B illustrate power 305 being provided to a circuit at various times by selecting between a first power supply and a second power supply, according to another example embodiment of the present invention. FIG. 3A depicts the situation when the second power supply voltage 310 is greater than the threshold value 315. FIG. 3B depicts the situation when the second power supply voltage 310 is less than the threshold value 315. The power 305 is supplied from the first power supply when the first supply voltage 320 is greater than one of the second supply voltage 310 and the threshold value 315. Alternatively, from time $t_1$ to time $t_2$ the power 305 is supplied from the second power supply because the first supply voltage 320 is less than both the second supply voltage 310 and the threshold value 315.

Figure 4:
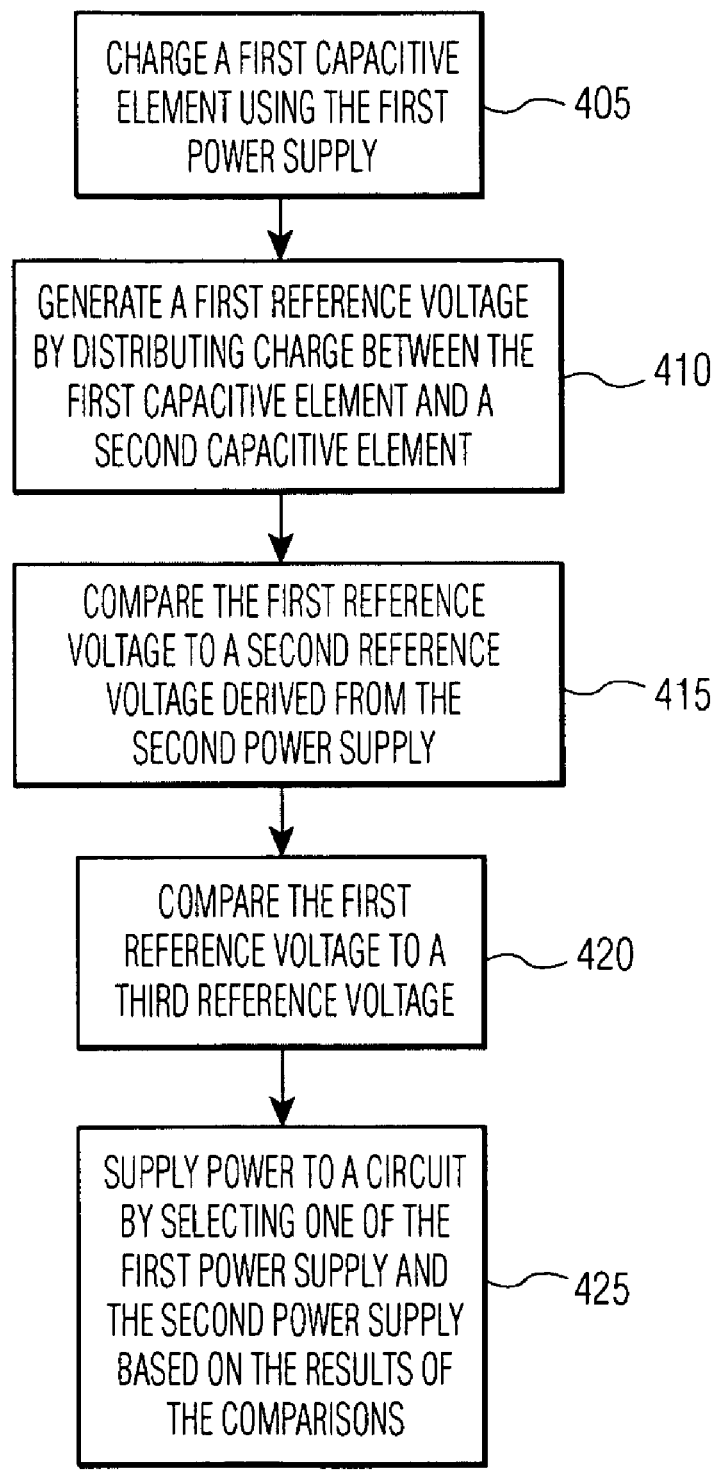
FIG. 4 illustrates a method for providing power to a circuit, according to an example embodiment of the present invention.

FIG. 4 illustrates a method for providing power to a circuit by selecting between a first power supply and a second power supply, according to further example embodiment of the present invention. In step 405, a first capacitive element is charged using the first power supply. A first reference voltage is generated by distributing charge between the first capacitive element and a second capacitive element in step 410. The first reference voltage is compared to a second reference voltage derived from the second power supply in step 415; the first reference voltage is also compared to a third reference voltage in step 420. Power is supplied to the circuit in step 425 by selecting one of the first and second power supplies based on the results of the comparisons in steps 415 and 420.

Various embodiments of the present invention can be implemented using different types of circuit including, but not limited to, integrated circuits, CMOS devices, battery switchover circuits, and other similar types of electrical circuits.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true scope of the present invention that is set forth in the following claims.

What is claimed is:

1. An arrangement for providing power to a circuit by selecting between a first supply and a second supply, the arrangement comprising:
    a first circuit that charges a first capacitive element using the first supply and generates a first reference voltage by distributing charge between the first capacitive element and a second capacitive element;
    a first comparator that compares the first reference voltage to a second reference voltage derived from the second supply;
    a second comparator that compares the first reference voltage to a third reference voltage; and
    a power control circuit that selects one of the first supply and the second supply based on the comparisons performed by the first and the second comparators.

2. The arrangement of claim 1, further comprising a second circuit that charges a third capacitive element using the second supply and generates the second reference voltage by distributing charge between the third capacitive element and a fourth capacitive element.

3. The arrangement of claim 2, wherein the second circuit includes:
    a first switching element coupled to the second supply and the third capacitive element;
    a second switching element coupled to the third capacitive element and the fourth capacitive element; and
    a third switching element coupled to the fourth capacitive element.

4. The arrangement of claim 3, wherein the first switching element is used to charge the third capacitive element using the second supply, the second switching element is used to distribute charge between the third capacitive element and the fourth captive element, and the third switching element is used to discharge the fourth capacitive element.

5. The arrangement of claim 2, wherein the third capacitive element and the fourth capacitive element are capacitors having approximately equal capacitance.

6. The arrangement of claim 1, wherein the first capacitive element and the second capacitive element are capacitors having approximately equal capacitance.

7. The arrangement of claim 1, wherein the first circuit includes:
    a first switching element coupled to the first supply and the first capacitive element;
    a second switching element coupled to the first capacitive element and the second capacitive element; and
    a third switching element coupled to the second capacitive element.

8. The arrangement of claim 7, wherein the first switching element is used to charge the first capacitive element using the first supply, the second switching element is used to distribute charge between the first capacitive element and the second capacitive element, and the third switching element is used to discharge the second capacitive element.

9. The arrangement of claim 1, wherein the first supply is a main power supply and the second supply is a backup battery.

10. The arrangement of claim 1, wherein the arrangement is implemented on an integrated circuit using CMOS technology.

11. The arrangement of claim 1, wherein the power control circuit selects the second supply when the first reference voltage is less than both the second reference voltage and the third reference voltage, otherwise the power control circuit selects the first supply.

12. The arrangement of claim 1, wherein the third reference voltage is derived from a threshold value.

13. A method for providing power to a circuit by selecting between a first supply and a second supply, the method comprising:
    charging a first capacitive element using the first supply;
    generating a first reference voltage by distributing charge between the first capacitive element and a second capacitive element;
    comparing the first reference voltage to a second reference voltage derived from the second supply;
    comparing the first reference voltage to a third reference voltage; and
    selecting one of the first supply and the second supply based on the comparisons.

14. The method of claim 13, further comprising charging a third capacitive element using the second supply, and generating the second reference voltage by distributing charge between the third capacitive element and a fourth capacitive element.

15. The method of claim 13, wherein the power is provided from the second supply when the first reference voltage is less than both the second reference voltage and the third reference voltage, otherwise the power is provided from the first supply.

16. The method of claim 13, wherein the first supply is a main power supply and the second supply is a backup battery, and the power is provided to the circuit by automatically switching between the main power supply and the backup battery.

17. The method of claim 13, wherein the circuit is a CMOS circuit.

18. The method of claim 13, wherein the first capacitive element and the second capacitive element are capacitors having approximately equal capacitance.

19. The method of claim 13, further comprising discharging the second capacitive element, and wherein a first switching element is used to charge the first capacitive element, a second switching element is used to distribute charge between the first capacitive element and the second captive element, and a third switching element is used to discharge the second capacitive element.

20. An arrangement for providing power to a circuit by selecting between a first supply and a second supply, the arrangement comprising:
    means for generating a first reference voltage by charging a first capacitive element using the first supply and generating the first reference voltage by distributing charge between the first capacitive element and a second capacitive element;
    means for comparing the first reference voltage to a second reference voltage derived from the second supply;
    means for comparing the first reference voltage to a third reference voltage; and
    means for selecting one of the first supply and the second supply based on the comparisons.

* * * * *